Jan. 3, 1939.  H. KÖHL  2,142,730
POWER TRANSMISSION MECHANISM
Filed March 11, 1936  4 Sheets-Sheet 2
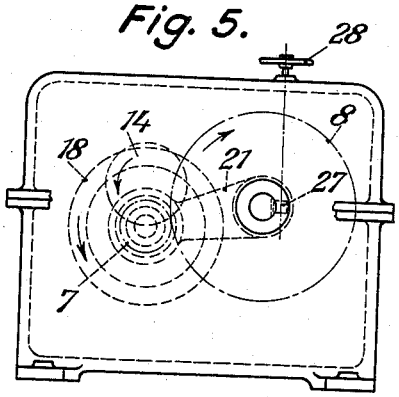
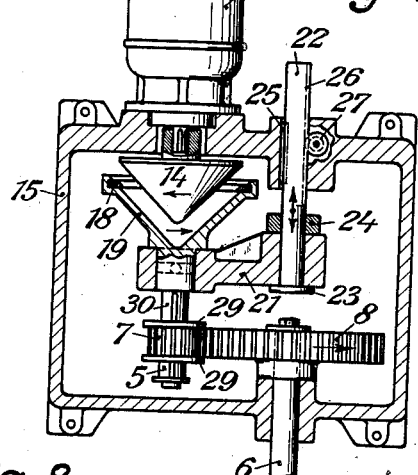
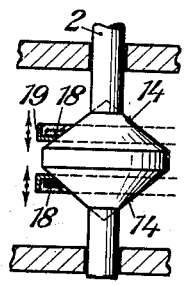
Inventor:
Hermann Köhl
By
Emil Bönnelycke
Attorney Jan. 3, 1939.                H. KÖHL                 2,142,730
                    POWER TRANSMISSION MECHANISM
                     Filed March 11, 1936        4 Sheets-Sheet 3
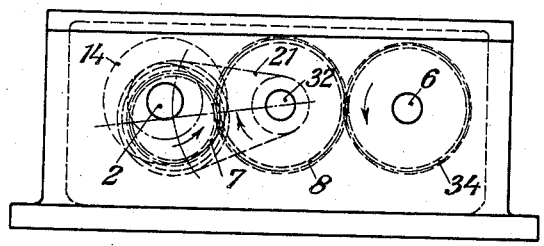
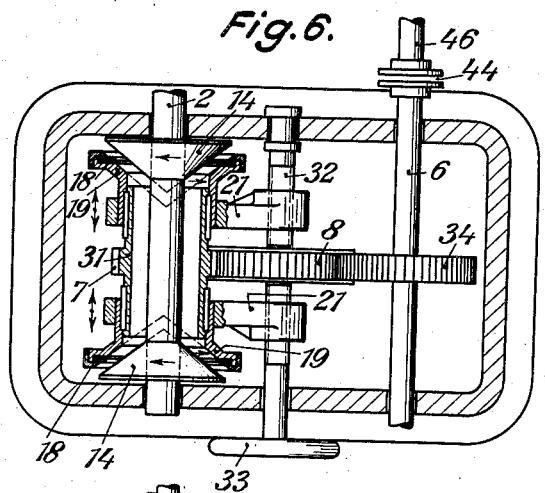
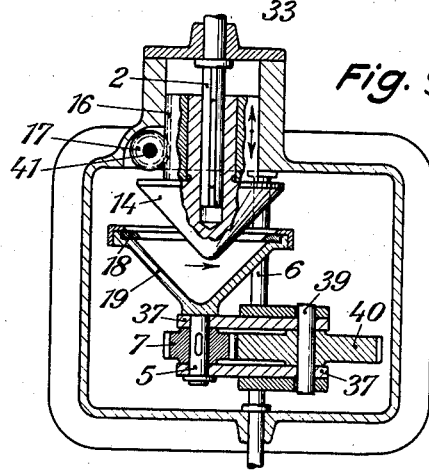
Inventor:
Hermann Köhl
By
Emil Bönnelycke
Attorney

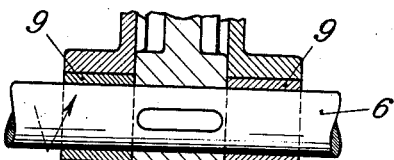
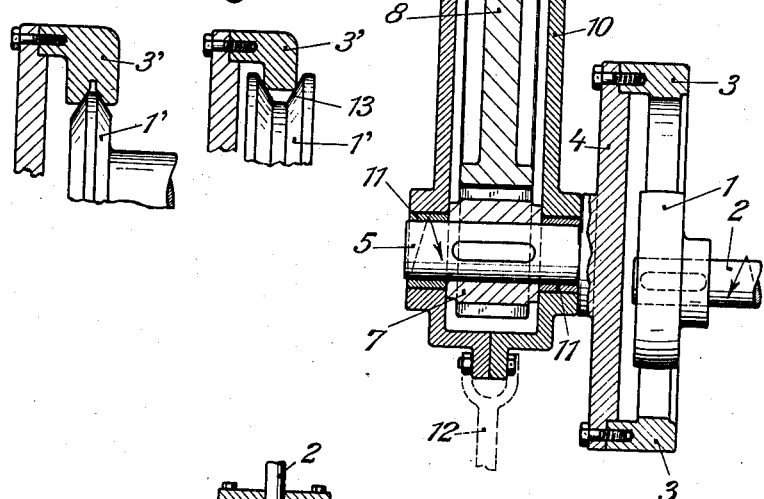
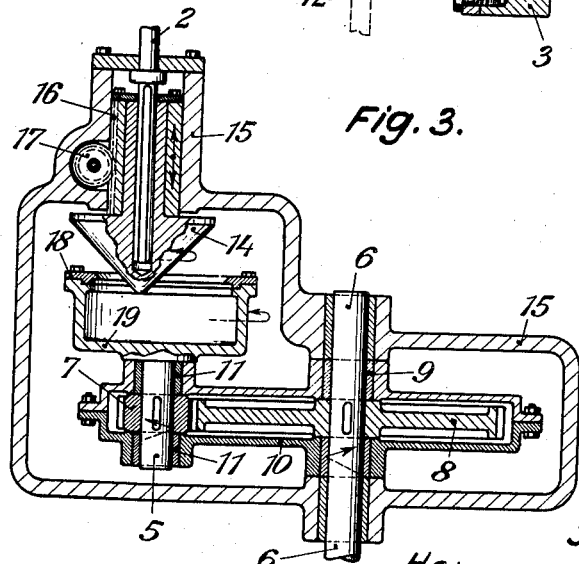

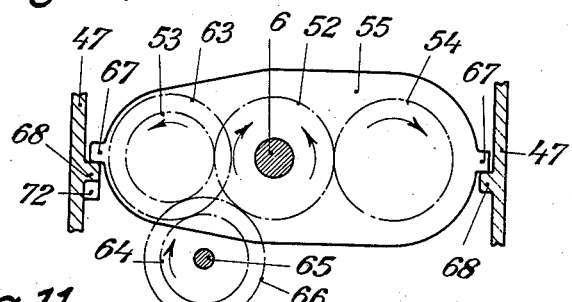
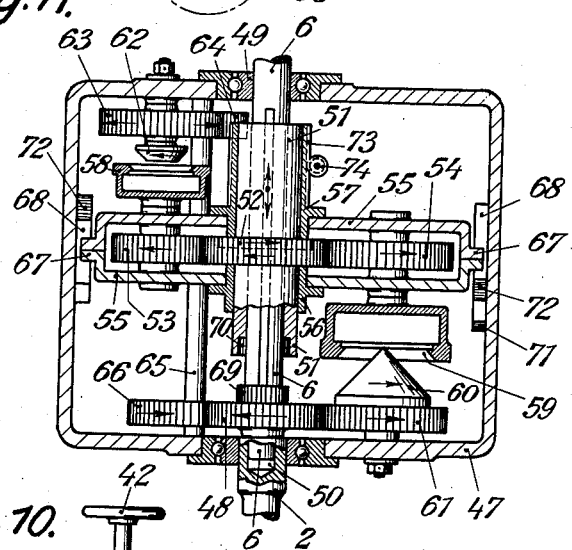
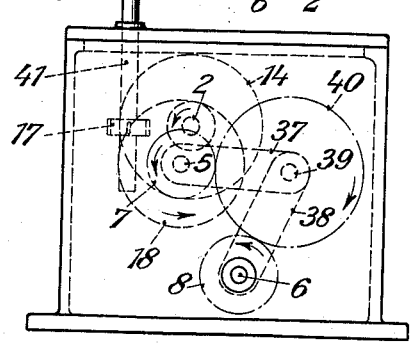

Patented Jan. 3, 1939

2,142,730

UNITED STATES PATENT OFFICE 2,142,730

POWER TRANSMISSION MECHANISM

Hermann Köhl, Stolberg, Germany, assignor, by mesne assignments, to P K Drive Corp., Jersey City, N. J., a corporation of New Jersey Application March 11, 1936, Serial No. 68,334
In Germany March 30, 1935

24 Claims. (Cl. 74—191)

In systems for transmitting the power of a prime mover, a driving member can be caused to act on a driven member through either flexible or non-flexible, i. e. rigid, transmission members. The first of these methods offers the advantage that the effect on the driving member of shocks, produced in the system through some cause or other, is in consequence of slip reduced, and therefore the danger of damage caused thereby is minimized. As, however, the effects of slip depend upon the condition of the flexible transmission members at the time being, the condition depending, for example, on weather influences, and as they increase considerably as the load increases and the respective members tend to wear and cause rapid deterioration of the flexible transmission members, they introduce into the transmission system an undesirable and uncertain factor. Furthermore, as in the case of belt drives, mechanisms involving slip take up considerable space. Rigid transmission members, (for example toothed wheels, crank mechanism, chain mechanism) avoid these disadvantages by uniform, positive engagement, but they also transmit all oscillations and shocks, undiminished, to the driving member and thus jeopardize reliable and satisfactory operation, and in the long run the undesired and uncertain factor makes its appearance on the driving side of the system where it is even less permissible than it was on the driven side.

The main object of the invention is to effect a compromise and combine the advantages of both types of drive and eliminate their disadvantages as much as possible. According to the invention a power transmission system embodies friction gearing employing contact surfaces of metal or other wear-resisting material in which the driving wheel touches within the driven wheel and the frictionally-driven surface is maintained automatically and constantly in contact with the driving surface by forces derived from the driven system and transmitted by means of a sun-and-planet gear in full to the position of contact between the surfaces. It is of prime importance that resilient intermediate members, for example belts or couplings for transferring the forces derived from the driven system to the place of contact of the friction wheels are avoided. It is also important that in all states of operation the transmission of forces from the driven system should be effected, so that no external positive means are required for ensuring the transmission of movement, and gear adjustment can thus be left to the action of the forces on the driven side of the system.

Experiments have shown that by the use of suitable materials, for example ordinary iron castings for an inner wheel and a high grade, abrasion resisting steel for an outer wheel which constitute a friction wheel gearing, during operation under the free play of the forces on the driven side, not only is there no appreciable wear but on both the members of the gearing a mechanical improvement of the contacting surfaces takes place, which improvement is manifested by a hardening and simultaneous polishing of the surfaces. It has been found to be advantageous to use on the driven side only a narrow friction ring, whereas the friction surfaces of the driving wheel (which is generally smaller) can be made broader, particularly when varying speeds are to be transmitted.

A transmission system in accordance with the application also provides the possibility of disengaging a gear without the use of any special engaging and disengaging devices. It is sufficient for one friction wheel to be raised from the other while overcoming the coupling force of the gear connection. In this manner the number of idle running parts and therefore the energy lost when the engine runs idly can be reduced very considerably and almost down to the idle-running energy of the motor itself.

If friction cone mechanism is used for the transmission with a constant speed of the driving members, it is possible to obtain different speeds of the driven members according to the relative adjustment of the friction cones, with the passage from one speed to another effected gradually, i. e. without steps. In the case of heavy loads it is possible to use double cones, both on the driving side and on the driven side of the system. It is also possible to effect transmission to a driven axle disposed at an angle to the driving axle, particularly when the axle of the displaceable friction wheel is arranged parallel to the working surface of the axially fixed friction cone in such a manner, that a stretch within the bearing of the driven wheel or driven ring is possible.

Particularly good transmission ratios with infinitely variable speeds are obtainable with friction cone mechanism when the planet wheel of the sun-and-planet gear is rigidly arranged on the axle of the driven cone or driven ring. In this case it is also advisable for the axle of the sun wheel of the sun-and-planet mechanism to be arranged at the side of the perpendicular axis of the driven cone or driven ring in such a manner that the weight of the entire revolving part of the sun-and-planet mechanism can be utilized for coupling the driving and driven members together. There can also be inserted between the planet wheel and the sun wheel in this arrangement an intermediate wheel, in which case a rocker lever which connects the planet wheel with the sun wheel is given angular form, the apex of the angle being designed to carry the intermediate wheel.

The power transmission mechanism may also be constructed as a reversible gear mechanism having or having not a direct coupling between the driving shaft and the driven shaft. Such a mechanism advantageously may be used for driving a vehicle.

The accompanying drawings illustrate by way of example various transmission systems according to the invention.

Fig. 1 shows a simple transmission system partly in section.

Figs. 2 and 2a show modifications of details shown in Fig. 1.

Fig. 3 shows partly in section the construction of an infinitely variable speed transmission system having a friction-cone mechanism.

Fig. 4 shows in section a transmission system similar to that shown in Fig. 3, but in which the friction-cone adjustment is on the driven side.

Fig. 5 is a front view of the transmission system shown in Fig. 4.

Fig. 6 shows partly in section a transmission system employing two cones.

Fig. 7 shows the gearing employed in the system shown in Fig. 6.

Fig. 8 shows a modification of a detail of Fig. 6.

Fig. 9 shows partly in section a transmission system having intermediate wheel in the sun-and-planet gear.

Fig. 10 is a front elevation of the gearing employed in the system shown in Fig. 9.

Fig. 11 shows in section a transmission system whereby the driven shaft can be driven in forward or reverse direction.

Fig. 12 is a diagrammatic side view of the system shown in Fig. 11.

Referring to Fig. 1, a driving wheel 1 is keyed on to the driving shaft 2. The wheel 1 may, for example, be made of cast iron, and its periphery may be cylindrical or spherical. The drive is transmitted by means of a ring 3 which is made of metal, for example steel. The ring 3 is fixed to a plate 4 which is mounted on a shaft 5.

The shaft 5 is coupled to the driven shaft 6 by means of toothed wheels 7, 8 which together form a sun-and-planet gear. The driven shaft 6 runs in stationary bearings 9 fixed in a housing 10, whereas bearing 11 of the shaft 5 can rotate about the shaft 6.

By means of a lever mechanism 12 (indicated only diagrammatically in the drawings) the planet wheels 7, the plate 4 and their common axle 5 can be raised to such an extent that the ring 3 no longer bears against the driving wheel 1. In this position the drive of the motor is disengaged. If it is to be re-engaged, then, by means of the lever mechanism 12, the plate 4 is lowered to such an extent that the ring 3 bears against the driving wheel 1.

The arrangement is such that when the transmission system operates, the forces on the driven side act so as to assist in coupling ring 3 with the driving wheel 1. This is the case when the respective directions of rotation are those indicated by the arrows. In this manner the forces are under the action of the transmission selected, transmitted positively and in full strength to the ring 3, and are fully effective in producing coupling pressure between the friction members.

Fig. 2 represents a modification in the shape of the friction members denoted by 1' and 3'. In this case the driving wheel 1' has a conical recess 13 in which the ring 3' engages in such manner that it bears against the conical surfaces on both sides of the recess 13 of the wheel 1'.

Another modification which can obviously be likewise effected is illustrated in Fig. 2a, according to which the driving wheel 1' is conical and a conical recess is provided in the ring 3'.

In the arrangement according to Fig. 3 the driving wheel 14 is conical and mounted so as to be axially displaceable in the housing 15. The axial displacement can be effected by means of an adjusting pinion 17 which engages a rack 16. A ring 18, the inside periphery of which is conical, is firmly fixed on the member 19. Axle 5 of the member 19 is mounted in bearings 11. A planet wheel 7 is keyed to the axle 5 and meshes with the toothed wheel 8 fixed on the driven axle 6.

After the driving wheel 14 has been adjusted, the mutual coupling of the friction wheels 14 and 18 is initiated by the weight of the parts 19, 5, 7, 10 and 11. During operation in which the axles rotate in the directions indicated by the arrows, the operation of the sun-and-planet gearing increases the initial coupling pressure between the two friction members 14 and 18. In this case also the driving wheel 14 may be, for example, made of cast iron and the ring 18 of a particularly hard material, for example high quality steel.

In the transmission systems illustrated in Figs. 4 and 5, the driving cone 14 of the gear is keyed fixedly to the axle of a motor 20. Thus it cannot be displaced in relation to the housing 15. Member 19 provided with a ring 18 is rotatably mounted on an arm 21 which is rotatably mounted on axle 22, but is prevented from axial displacement thereon by a collar 23 and adjusting disc 24. The axle 22 is prevented from turning by a key 25, and is provided with lateral teeth 26 which mesh with a toothed wheel 27. By rotation of the toothed wheel 27, for example by means of a hand-wheel 28 (Fig. 5) the axle 22 can be displaced axially, and thus the surface of contact between the ring 18 and the driving cone 14 altered.

Integral with member 19 is an axle 5 on which is keyed the planet wheel 7 of the sun-and-planet gear 7, 8 the sun wheel 8 being keyed to driven shaft 6. By means of flanges 29 the planet wheel 7 engages the sun wheel 8, so that it cannot be displaced axially in relation to the latter. The planet wheel 7, however, is mounted on the axle 5 so as to be displaceable axially by means of a feather 30 fixed to the planet wheel 7 so that the axial adjustment of the member 19 together with the ring 18 relatively to the driving cone 14 is not prevented.

As the axle 22 and the shaft 6 are disposed concentrically to each other, the adjusting system consisting of the members 18, 19, 21, 5, 7 and 8 can rotate about the common axis of the members 22 and 6; likewise, in the manner already described, the forces on the driven side can be transmitted to the place of contact between the ring 18 and the driving wheel 14. The directions of rotation of the members 14, 19 and 8 required for this purpose are indicated by arrows.

In the double-cone transmission system illustrated in Figs. 6 and 7 two cones 14 are mounted on the driving axle 2. The cones 14 co-operate with rings 18 in members 19. The members 19 are mounted so as to be axially displaceable but non-rotatable on a bush 31 on which planet wheel 7 is mounted. Each member 19 is held by an arm 21. One arm engages in a right-hand thread and the other arm in a left-hand thread on a spindle 32. If the spindle 32 is turned by hand-wheel 33, then both arms 21 together with the members 19 held thereby are either moved inwards in order to reduce the speed of the driven members or outwards in order to increase the speed of the driven members. Sun wheel 8 of the sun-and-planet gear 7, 8 is rotatably mounted on the centre part of spindle 32 and meshes with toothed wheel 34 on driven shaft 6.

Fig. 8 shows the driving cone 14 arranged on the driving axle 2 in a reverse sense to the arrangement shown in Fig. 6. The corresponding arrangement of the rings 18 and the members 19 is also shown in Fig. 8. The members 19 are adjusted in the direction indicated by the arrows, either both inwards or both outwards.

In the arrangement shown in Figs. 9 and 10 the driving cone is mounted in a manner similar to that indicated in and explained with reference to Fig. 3. The driven member 19 provided with a ring 18 and an axle 5 is, however, mounted at the end of a rocker lever which comprises a lever 37 and a lever 38, which are pivotally connected through a pin 39. The free end of the lever 38 is, in this case, adapted to pivot about the driven shaft 6. The levers 37 and 38 are preferably double-armed, the planet wheel 7, the sun wheel 8 and an intermediate wheel 40 connecting these two wheels being inserted between the arms of the levers 37 and 38 respectively. All three wheels are in positive engagement and serve to transmit the rotary motion from the axle 5 to the shaft 6. The levers 37 and 38 are set at an angle to each other and the pin 39 is the axle of the intermediate wheel 40.

In this case the arrangement is such that the weights of the members 38, 39, 40 located at the right of the shaft 6 (Fig. 10) and also the weights of the members 18, 19, 5, 7 and 37 acting on the left of the shaft 6 tend to couple the ring 18 with the driving cone 14. This occurs when the directions of rotation are those indicated by the arrows in Fig. 10. In this arrangement the adjustment of the driving cone is effected by means of the rack 16, the toothed wheel 17, its axle 41 and the hand wheel 42.

Fig. 11 illustrates a transmission system whereby the driven shaft may be driven in the forward or reverse direction. The driving shaft 2 protrudes only a short distance into housing 47 and carries a toothed wheel 48. The axis of the driven shaft 6 coincides with that of the driving shaft 2, the shaft 6 being rotatably mounted in bearings 49 in the housing 47 and in a boring 50 in the driving shaft 2. On the driven shaft 6 a sleeve 51 is arranged so as to be axially displaceable. Sun wheel 52 of a two-sided sun-and-planet gear is fixedly mounted on the sleeve 51. The planet wheels 53 and 54 which mesh in the sun wheel 52, are mounted in the manner previously described in housing 55 which with its bearing sleeves 56 and 57 is arranged to be freely rotatable about the sleeve 51. The planet wheel 53 is connected fixedly with the driven plate member 58 and the planet wheel 54 with the driven plate member 59. The driven plate members 58 and 59 are situated on different sides of the housing 55.

The friction cone 60 which co-operates with the driven plate 59 is attached to the toothed wheel 61 which meshes directly with the toothed wheel 48 on the driving shaft 2. The friction cone 62 which co-operates with the driven member 58 is attached to a toothed wheel 63. The toothed wheel 63 engages a toothed wheel 64 fixed on a shaft 65, on which is also fixed a toothed wheel 66 engaging with the toothed wheel 48. Consequently the friction cone 62 revolves in a direction opposite to that in which the friction cone 60 revolves. Thus according to whether the sleeve 51 with the sun-and-planet gear 52, 53, 54 is displaced downwards or upwards by means of a device of known type, such as rack 73 and toothed wheel 74, the friction cone 60 or the friction cone 62 transmits the drive to the driven shaft 6, which thereupon runs either in the same directions as, or in a direction opposite to that of the driving shaft.

In order to effect the correct engagements in a positive manner, the housing 55 is preferably provided with pins 67 which bear on guides 68 of the housing 47. At the position 72 where it is intended that the driven member 58 or 59 shall bear against the appropriate friction cone 62 or 60, the guides 68 curve away from the pins 67 in order to ensure that correct and free contact between the friction members takes place.

The gear according to Figs. 11 and 12 can, particularly when it is intended for driving a vehicle, also be provided with a direct coupling between the driving shaft 2 and the driven shaft 6. With this object in view, for example, a toothed coupling wheel 69 which can be introduced into corresponding teeth 70 at the end of the sleeve 51 is attached to the toothed wheel 48. Corresponding to the position of the housing 55 at which the toothed wheel 69 and the teeth 70 engage there is then provided, for example, a raised portion 71 of the appropriate guide 68, in order to lift the driven member 59 from its friction cone 60 during operation of the direct coupling gear.

In all the transmission systems described and illustrated, the driving cone and the driven cone or the driven ring are made of a hard material such as metal, the driven ring or cone being generally made of a harder material or metal than that of the driving cone. The flange connections 44 shown in Figs. 6 and 9 serve as clutches connecting the shafts 2 or 6 with driving shaft of a prime mover or driven shaft 46 of a driven machine of the like, respectively.

I claim:

1. In a power transmission system the combination with a driving shaft of a driving friction-wheel having a friction-surface, a driven friction-wheel having also a friction-surface and surrounding the driving friction-wheel, said friction wheels having contacting surfaces of hard and rigid materials, a driven shaft, means operatively connecting the driven shaft with the driven friction-wheel, and a swinging member in which the driven friction wheel is journalled, said member being so arranged with respect to the direction of rotation of the driven shaft as to transmit the resisting forces of the driven shaft in full to the position of contact between the friction-surfaces of the friction-wheels in order to keep said surfaces automatically and constantly in contact during operation.

2. In a power transmission system the combination with a driving shaft of a driving friction-wheel having a friction-surface, a driven friction-wheel having also a friction-surface and surrounding the driving friction-wheel, said friction wheels having contacting surfaces of hard and rigid materials, a driven shaft, sun and planet gear means connecting the driven shaft with the driven friction-wheel, and a swinging member carrying the driven friction wheel and the planet gear, said member being so arranged with respect to the direction of rotation of the sun gear as to transmit the resisting forces of the driven shaft in full to the position of contact between the friction-surfaces of the friction-wheels in order to keep said surfaces automatically and constantly in contact during operation.

3. In a power transmission system as claimed in claim 2, the contacting surface of hard and rigid material of the driven friction wheel consisting of a narrow ring.

4. In a power transmission system as claimed in claim 2, the contacting surface of hard and rigid material of the driven friction wheel consists of a narrow ring of steel.

5. In a power transmission system as claimed in claim 2, the arrangement that the planet wheel of the sun-and-planet gear means and the driven friction-wheel are fixed on the same shaft.

6. In a power transmission system as claimed in claim 2, the arrangement that the sun wheel is carried by a shaft the axis of which is laterally spaced from the polar axis of the driven friction-wheel.

7. In a power transmission system the combination with a driving shaft, of a driving friction-cone having a friction-surface, a driven friction-ring having a corresponding inner friction-surface and surrounding the driving friction-cone, means adapted to alter the axial distance between the driving friction-cone and the driven friction-ring, a driven shaft, sun and planet gear means connecting the driven shaft with the driven friction-ring, and a swinging member carrying the driven friction ring and the planet gear, said member being so arranged with respect to the direction of rotation of the sun gear as to transmit the resisting forces of the driven shaft in full to the position of contact between the friction-surfaces of the driving friction-cone and the driven friction-ring in order to keep said surfaces automatically and constantly in contact during operation.

8. In a power transmission system the combination with a driving shaft, of a driving friction-cone having a friction-surface, a driven friction-ring having a corresponding inner friction-surface and surrounding the driving friction-cone, means adapted to alter the axial distance between the driving friction-cone and the driven friction-ring, a driven shaft, sun and planet gear means connecting the driven shaft with the driven friction-ring, and a swinging member carrying the driven friction ring and the planet gear, said member being so arranged with respect to the direction of rotation of the sun gear as to transmit the resisting forces of the driven shaft in full to the position of contact between the friction-surfaces of the driving friction-cone and the driven friction-ring in order to keep said surfaces automatically and constantly in contact during operation, said planet wheel being coaxial and rotating with a member of said sun and planet gear means connected to the driven friction-ring.

9. In a power transmission system the combination with a driving shaft, of a driving friction-cone having a friction-surface, a driven friction-ring having a corresponding inner friction-surface and surrounding the driving friction-cone, means adapted to alter the axial distance between the driving friction-cone and the driven friction-ring, a driven shaft, sun and planet gear means connecting the driven shaft with the driven friction-ring, and a swinging member carrying the driven friction ring and the planet gear, said member being so arranged with respect to the direction of rotation of the sun gear as to transmit the resisting forces of the driven shaft in full to the position of contact between the friction-surfaces of the driving friction-cone and the driven friction-ring in order to keep said surfaces automatically and constantly in contact during operation, said gear means including a member connected to the driven friction-ring and arranged at the side of the polar axis to which member the planet wheel is co-axially and rotatably connected.

10. In a power transmission system the combination with a driving shaft, of a driving friction-cone having a friction-surface, a driven friction-ring having a corresponding inner friction-surface and surrounding the driving friction-cone, means adapted to alter the axial distance between the driving friction-cone and the driven friction-ring, a driven shaft, sun and planet gear means having an intermediate wheel inserted between the sun and planet gears and connecting the driven shaft with the driven friction-ring, a swinging member carrying the driven friction ring and the planet gear, said member being so arranged with respect to the direction of rotation of the sun gear as to transmit the resisting forces of the driven shaft in full to the position of contact between the friction-surfaces of the driving friction-cone and the driven friction-ring in order to keep said surfaces automatically and constantly in contact during operation, and said swinging member consisting of two parts articulated together in angular relationship by a pin forming the shaft of the intermediate wheel.

11. In a power transmission system the combination with a driving shaft, of two driving friction-cones arranged opposite to another on the driving shaft and having friction-surfaces, two driven friction-rings each having an inner friction-surface associated with and surrounding the respective friction driving cones, means adapted to alter simultaneously the axial distances between the driving friction-cones and the corresponding driven friction-rings, a driven shaft, sun and planet gear means and a toothed wheel connecting the driven shaft with both driven friction-rings, a swinging member carrying the driven friction rings and the planet gear, said member being so arranged with respect to the direction of rotation of the sun gear as to transmit the resisting forces of the driven shaft in full to the positions of contact between the friction-surfaces of the driving friction-cones and the driven friction-rings in order to keep said surfaces automatically and constantly in contact during operation.

12. In a power transmission system the combination with two driving shafts adapted to be rotated in opposite directions, of one driving friction-cone for each driving shaft, one driven friction-ring for each driving friction-cone surrounding said cone, a driven shaft, a double sun-and-planet gear connecting the driven shaft with the driven friction-rings, said rings being arranged at opposite sides of said sun-and-planet gear, means adapted to displace the double sun-and-planet gear axially to the driven shaft and to bring either driven friction-ring in contact with its driving friction-cone, and a swinging member carrying the driven friction rings and the planet gears, said member being so arranged with respect to the direction of rotation of the sun gear as to transmit the resisting forces of the driven shaft to the position of contact between the friction surfaces of whichever pair of friction wheels is in operation.

13. In a power transmission system the combination with a driving shaft, of two intermediate shafts positively connected to the driving shaft whereby one intermediate shaft rotates in opposite direction to the other intermediate shaft, one driving friction-cone for each intermediate shaft, one driven friction-ring for each driving friction-cone surrounding said cone, a driven shaft, a double sun-and-planet gear connecting the driven shaft with the driven friction-rings, said rings being arranged at opposite sides of said sun-and-planet gear, means adapted to displace the double sun-and-planet gear axially to the driven shaft and to bring either driven friction-ring in contact with its driving friction-cone, and a swinging member carrying the driven friction rings and the planet gears, said member being so arranged with respect to the direction of rotation of the sun gear as to transmit the resisting forces of the driven shaft to the position of contact between the friction surfaces of whichever pair of friction wheels is in operation.

14. In a power transmission system the combination with a driving shaft, of two intermediate shafts positively connected to the driving shaft whereby one intermediate shaft rotates in opposite direction to the other intermediate shaft, one driving friction-cone for each intermediate shaft, one driven friction-ring for each driving friction-cone surrounding said cone, a driven shaft, a double sun-and-planet gear connecting the driven shaft with the driven friction-rings, said rings being arranged at opposite sides of said sun-and-planet gear, means adapted to displace the double sun-and-planet gear axially to the driven shaft and to bring either driven friction-ring in contact with its driving friction-cone, means adapted to couple directly the driven shaft with the driving shaft of the system, and a swinging member carrying the driven friction rings and the planet-gears, said member being so arranged with respect to the direction of rotation of the sun gear as to transmit the resisting forces of the driven shaft to the position of contact between the friction surfaces of whichever pair of friction wheels is in operation.

15. In a power transmission system the combination with a driving shaft of a driving friction-wheel having a friction-surface, a driven friction-wheel having also a friction-surface and surrounding the driving friction-wheel, said friction wheels having contacting surfaces of hard and rigid materials, a driven shaft, means connecting the driven shaft with the driven friction-wheel, said means including a swinging member adapted to transmit the resisting forces of the driven shaft in full to the position of contact between the friction-surfaces of the friction-wheels in order to keep said surfaces automatically and constantly in contact during all stages of operation, and a device adapted to interrupt the driving connection between the driving shaft and the driven shaft of the system by lifting the friction-wheels apart.

16. In a power transmission, a driving shaft, a friction wheel rotated thereby, a driven shaft, a second friction wheel geared to the driven shaft, said friction wheels having contacting surfaces of hard and rigid materials, and an arm carrying the second friction wheel and pivoted about an axis so located relatively to that of said wheel that said arm is subjected to a couple about its pivot due to the reaction on the arm of the rotation of the driven shaft, the arrangement of the friction wheels and the direction of said couple being such as to hold the two friction wheels in driving contact.

17. In a power transmission, a driven shaft, a sun-wheel on the driven shaft, a planet wheel engaging the sun-wheel, a swinging frame supporting the planet wheel, a friction wheel supported by said frame and rotating with the planet wheel, a driving shaft, and a friction wheel on said driving shaft co-operating with the first mentioned friction wheel, said friction wheels having contacting surfaces of hard and rigid materials, and in which the parts are so arranged with respect to the direction of rotation of the driven shaft that the reaction couple on the swinging frame due to said rotation acts in the direction to hold the friction wheel carried by said frame against the friction wheel on the driving shaft.

18. A friction drive comprising a driven shaft, a second shaft, a pair of cooperating wheels one on each shaft, a driving shaft, a pair of radially cooperating friction members having contacting surfaces of hard and rigid materials one on the driving shaft and the other on the second shaft, and means supported on the driven shaft and in which the second shaft is rotatably mounted so that the load resistance of the driven shaft automatically creates the radial contact pressure between the pair of friction members of which one freely adjusts itself to the other member.

19. A friction drive comprising a pair of shafts, an intermediate shaft, a pair of cooperating wheels one on one of said pair of shafts and the other on the intermediate shaft, a pair of radially cooperating friction members having contacting surfaces of hard and rigid materials one on the other of said pair of shafts and the other on the intermediate shaft, and means mounted on the one of said pair of shafts and in which the intermediate shaft is rotatably mounted so that the load resistance on the one of the pair of shafts automatically creates the radial contact pressure between the pair of friction members of which one freely adjusts itself to the other member.

20. A friction drive according to claim 18, in which the pair of cooperating wheels are in the form of gear wheels meshing with each other of which one gear wheel has a greater diameter than the other wheel.

21. A friction drive according to claim 18, in which one of the pair of radially cooperating friction members is in the form of a cone and means are provided to adjust one of the pair of cooperating friction members relative to the other so that the drive will be variable.

22. A friction drive according to claim 18, in which the pair of cooperating wheels are in the form of gear wheels meshing with each other of which the gear wheel on the driven shaft has a greater diameter than the other wheel which thereby transfers the force of the load resistance to the pair of friction members.

23. A friction drive according to claim 18, in which one of the pair of radially cooperating friction members is in the form of a cone and means are provided to adjust one of the pair of cooperating friction members relative to the other so that the drive will be variable, and in which the pair of cooperating wheels are in the form of gear wheels meshing with each other of which the gear wheel on the driven shaft has a greater diameter than the other wheel which thereby transfers the force of the load resistance to the pair of friction members.

24. A friction drive according to claim 18, in which the radial contact pressure between the pair of friction members increases or decreases upon increase or decrease of the load resistance of the driven shaft.

HERMANN KÖHL.